Patented July 26, 1932

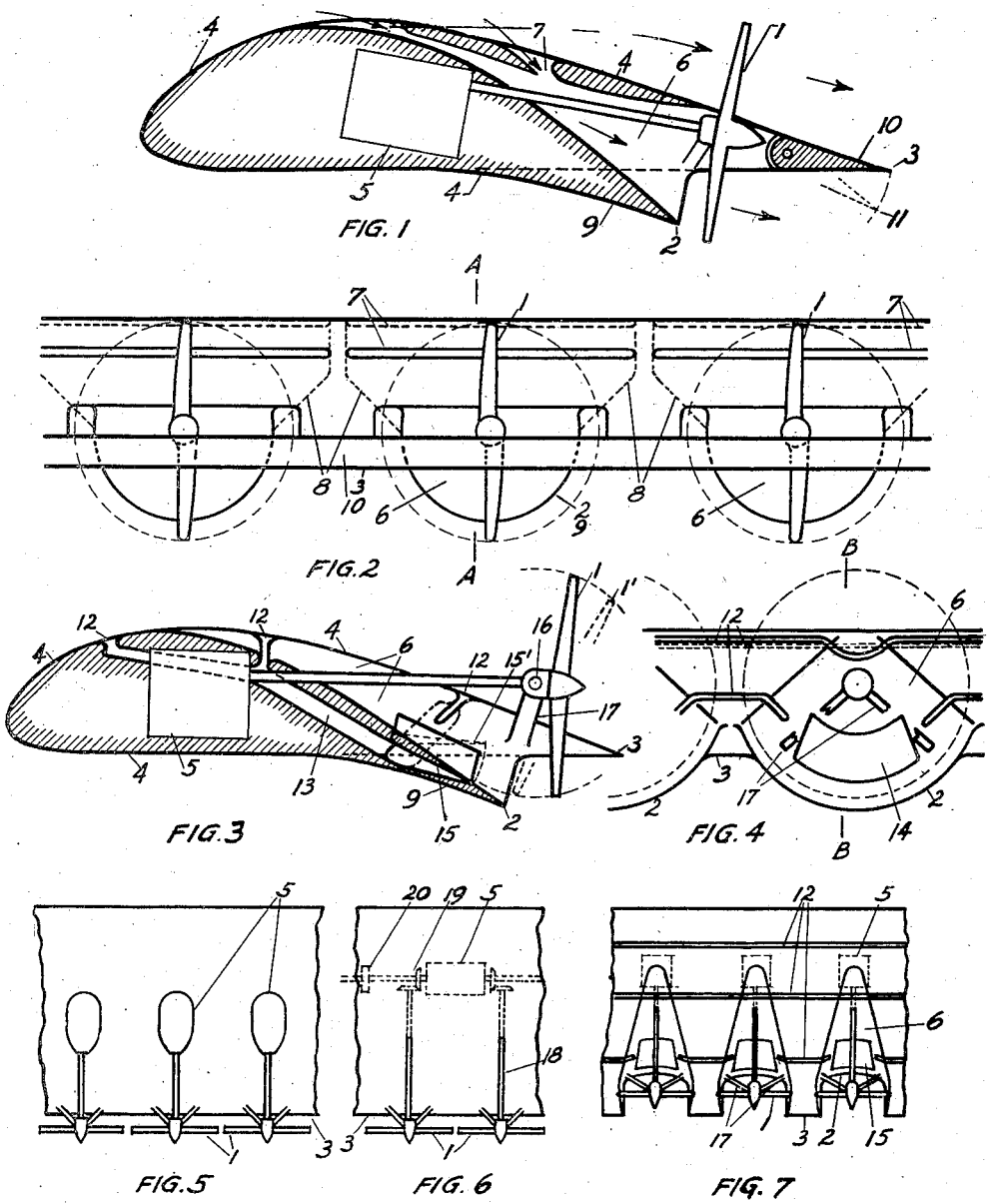

1,868,832

UNITED STATES PATENT OFFICE

MATHIAS HENTER AND ERNST KÄSER, OF WEST ALLIS, WISCONSIN

AIRCRAFT

Application filed April 28, 1931, Serial No. 533,531, and in Germany July 27, 1929.

The invention relates to an arrangement to prevent the phenomenon of the flow breaking away from the upper side of a sustaining wing for aircraft and for increasing the lift thereof.

The total drag of a sustaining wing or aerofoil for aircraft comprises the induced drag which depends upon the mass of air washed down from the aerofoil and is due to aerodynamics of a definite aerofoil and the aspect ratio thereof, and the profile drag of the aerofoil caused by friction of the air on the surface of the aerofoil.

The profile drag of the aerofoil may be considered in two parts: The form drag associated with the vortex street behind the aerofoil and the frictional drag on the surface of the aerofoil. It is necessary to distinguish between the phenomenon of ordinary friction as it appears for example on the lower side of the sustaining wing without forming a considerable eddying wake on the boundary layer adjacent to the surface of the wing, and between such a phenomenon as it appears on the upper side of the wing in the boundary layer where the velocity of the flow decreases. In this region the boundary layer of the flow adjacent to the surface of the aerofoil is brought to rest before reaching the stagnation point, that is the velocity of the flow adjacent to the surface of the wing becomes zero relative to the wing on account of the friction on the surface of the aerofoil.

The pressure distribution on the upper side of the aerofoil is such, that a pressure drop exists from the trailing edge towards the leading edge on account of the decreasing velocity of the flow near the surface, which decreasing velocity is caused by the increasing area for the flow. As the pressure drop is counterdirectional to the flow, the boundary layer, which is brought to rest, tends therefore to follow this pressure drop and a reverse flow will set in to cause the flow breaking away and to form a vortex street behind the upper side of the aerofoil. This phenomenon occurs especially at large angles of incidence, when the flow breaks away to form a broad vortex wake. A considerable increase of the profile drag is caused by this phenomenon of the flow breaking away from the upper side of the aerofoil on account of the energy carried away by the vortex wake, and the circulation and the down wash are reduced, therewith the lift.

The purpose of this invention is to prevent this phenomenon of the flow breaking away from the upper side of a sustaining wing for aircraft by means of the suction induced by the propulsive airscrews of the craft. An artificial pressure drop is superimposed upon the natural pressure distribution given by the profile and the angle of incidence of the aerofoil in such a manner, that the above mentioned undesired reverse flow cannot occur, thereby reducing the profile drag and therefore also the total drag at normal cruising speed as well as increasing the working range of the aerofoil of the aircraft to reduce the landing speed by a large angle of incidence.

For airliners it is important to obtain for normal cruising a high ratio of lift to total drag and for economical reasons high cruising speed combined with a high loading factor of the aerofoil is important. It is necessary for reasons of safety to have a high temporary lift coefficient to allow low flying speed and short runways for starting and landing. Also the human element to operate an aircraft has to encounter not so many difficulties with such an aircraft of a range of flying speeds in wide variations, and the human element is not liable in the same measure to stall such an aircraft, an increase of safety is therefore obtained.

With this novel feature of preventing said reverse flow it is possible to build thicker aerofoils, thereby successfully applying a higher loading factor, further the application of flaps on the trailing edge of the aerofoil to increase the angle of downwash from the aerofoil is also associated with said novel feature.

The lift of such an aircraft can be further increased temporarily by directing the discharged air from the propulsive airscrews downwards to obtain a lift component direct from the power plant.

It is known to mount a single air screw of the pusher type above the trailing edge of a sustaining wing in order to accelerate only air flowing from the upper side thereof. It is also known to mount a plurality of air screws behind the trailing edge of a sustaining wing in such a manner that air flowing as well at the upper side as at the lower side of the wing, is accelerated.

The first method of mounting a single air screw above the straight trailing edge does not prevent the phenomenon of the flow breaking away very efficiently. In the second method, the air screws work in two different air currents. This decreases the efficiency of the air screws, causes aerodynamically undesirable acceleration of air on the lower side of the wing and exposes technically the air screws to damage by ground objects (land plane) or by water (sea plane).

To avoid the disadvantages stated above and to accomplish or intensify the suction of the airscrew to prevent the phenomenon of the flow breaking away from the upper side of a sustaining wing the invention provides a depression on the upper side of a sustaining wing which depression ends into a circularly depressed trailing edge before the corresponding air screw, thereby shielding the air screw against the air flowing on the lower side of the wing. Thus, the suction induced by the air screw effects a larger portion of the upper wing surface than with the air screw above a straight, undepressed trailing edge. The new kinetic energy induced upon the boundary layer prevents this layer from a reverse flow. To increase the effect for a large portion of the wing a plurality of air screws is suitably mounted along an essential part of the trailing edge in the described manner. This way it is not necessary to place the air screws as close side by side as if a bank of airscrews would be provided along and above a certain portion of a straight trailing edge, which, of course, would to a certain degree already prevent the breaking away of the flow from the upper wingside.

The arrangement of the depressions with their corresponding airscrews behind enables also suction of air through slots and ducts from such points of the upper side of the aerofoil, where the flow is liable to break away. Such air is then discharged rearwards by the airscrews and the reverse flow of the boundary layer near the slot or opening inlets cannot occur.

Further the arrangement of a plurality of such air screws mounted as described enables to discharge the air with a downward component for obtaining an additional lift by means of additional controllable flaps at the trailing edge and behind the air screws, respectively, the plane of rotation of the airscrew itself is turned to accomplish the feature of a downward directed discharge and at the same time to prevent the flow breaking away.

The airscrews are distributed along the span of the wing on the trailing edge and from the centre of the span of a monoplane for example to a desired length of the span on both sides. It is not necessary that the screws are distributed along the entire span of the wing, as the phenomenon of the flow breaking away appears mainly near the centre of the span where the relative angle of incidence is the largest for not twisted wings.

The arrangement of the propulsive airscrews near the trailing edge and along the same is favorable for the reason, that the sustaining wing or parts thereof are not disposed within the accelerated air discharged from the airscrews, as such accelerated air causes an increase of the frictional drag. (The loss of energy resulting from the friction on the surface of the wing increases approximately with the third power of velocity.)

As additional features resulting from the arrangement of the air screws along the trailing edge of the wing be mentioned, that for large flying boats the motors can be arranged within the wing without occupying valuable space for the passengers, who are also placed in the wing in its front part, that annoying machine noises are diminished for the passengers, and that for amphibians the airscrews are protected from water.

In the accompanying drawing which is illustrative of the invention,

Fig. 1 is a sectional view taken on line A—A of Fig. 2.

Fig. 2 is a view of a part of a sustaining wing seen from the trailing edge.

Fig. 3 is a sectional view taken on line B—B of Fig. 4.

Fig. 4 is a view of a part of a sustaining wing seen from the trailing edge.

Fig. 5, Fig. 6, and Fig. 7 are plan views of wing sections.

In Figs. 1 and 2 a plurality of airscrews 1 is arranged on the trailing edges 2 and 3 of a sustaining wing 4 for aircraft. The airscrews 1 are driven by the power plant 5. Only air from the upper side of the wing flows to the airscrews as shown in Fig. 1. Air screw 1 sucks air with its lower area of action through duct 6 and slots 7. The slots 7 are arranged in the direction of the span of the wing which is clearly to be seen in Fig. 2. Dotted lines 8 of Fig. 2 indicate ducts 6 which are connected with the corresponding slots 7. Ducts 6 end into a partial circular depression 9 of the profile of the wing 4. By means of this depression 9 before the air screw 1 only air from the upper side of the wing flows to the airscrew. Thus by suction of the airscrew the phenomenon of the flow breaking away from the upper side of the wing is prevented. A controllable flap 10 is provided behind the air screws 1 and completes in its neutral position, as shown in full lines in Fig. 1, the regular profile 3 of the wing 4. The purpose of this flap 10 is to direct the discharge flow of the airscrews as well as of the wing downwards to obtain temporarily a high lift coefficient for instance for landing. Dotted position 11 of the flap 10 shows it in a position to direct the air downward.

The arrows in Fig. 1 indicate the direction of the flow of the air.

Figs. 3, 4, and 7 belong together and show a different arrangement of that of Figs. 1 and 2. Plan view Fig. 7 is drawn in a smaller scale than Figs. 3 and 4. Similar numbers correspond to similar parts in Figs. 1 and 2. Ducts 6 are in this arrangement not covered as in Figs. 1 and 2. The ducts 6 are open partial circular depressions in the profile of the wing and end into the partial circular trailing edge 2. 3 shows the trailing edge of the regular profile between the depressions for the air screws. Slots 12 are arranged on the upper side of the wing in direction of the span. The slots 12 lead into the ducts 13 which end into duct 6 through opening 14 directly before the airscrews 1. The cover 15 may control the outlet of air from duct 13 into the depression 6. In open position 15' of cover 15 or when cover 15 is entirely omitted, air is sucked through slots 12, ducts 13 and opening 14 and discharged rearwards by the air screws 1 thus preventing breaking away of the flow as well in the depressed profile as from the regular profile between the depressions. Instead of arranging a controllable flap 3 as shown in Fig. 1 for directing the air flow downwards the air screws 1 of Figs. 3, 4, and 5 are mounted in such a manner that the axis of the airscrew can be turned around pivot 16 thereby enabling to bring the airscrew in the position 1'. 17 are supports for gear boxes and bearings of the airscrews.

Fig. 5 shows a simplified arrangement of the airscrews to prevent the flow breaking away from the upper side of the wing. Airscrews 1 are mounted along the trailing edge 3 of a selected profile for the wing 4. The power plant 5 is built partly within the wing 4 and partly protruding on the upper side of the wing. The protruding part of the power plant is cowled in streamline shape.

Fig. 6 shows an arrangement similar to Fig. 5. Here the power plant 5 is located within the wing. The axis of the motors is in the direction of the span of the wing and the shafts 18 of the airscrews 1 are driven by the motors through gears 19. Advantage of this arrangement is the possibility of coupling the motors and screws directly and of driving several screws from one motor. This intercoupling is important for reason of safety. 20 is a coupling to the adjacent motors. On account of being plan views, Figures 5 and 6 do not show the depressions on the trailing edge.

Although the invention has been described in considerable detail, such description is intended as illustrative rather than limiting, for example the mounting of the airscrews along the trailing edge of the wing is in such a manner, that the airscrews reach somewhat below the trailing edge of the wing or below the depressions therein, so is to understand, that this is still within the scope of the invention.

Although the mounting of the airscrews on the trailing edge of the wing somewhat in front or behind this trailing edge is to be understood within the scope of the invention.

Having thus described our invention, what we claim as new, and desire to secure by Letters Patent, is:

1. An arrangement to prevent the phenomenon of the flow breaking away from the upper side of a sustaining wing for aircraft and to increase the lift thereof comprising a plurality of propulsive airscrews of the pusher type mounted on the trailing edge of the aerofoil, a plurality of depressions formed in the upper side of the aerofoil, each depression leading to a corresponding airscrew in such a manner, that preferably only air from the upper side of the aerofoil flows to said airscrews, substantially as described.

2. An arrangement to prevent the phenomenon of the flow breaking away from the upper side of a sustaining wing for aircraft and to increase the lift thereof comprising one or a plurality of propulsive airscrews of the pusher type mounted on the trailing edge of the aerofoil, one or a plurality of depressions formed in the upper side of the aerofoil, each depression leading to the corresponding air screw, slots arranged in the surface on the upper side of the aerofoil, said slots being connected by ducts with said depressions.

3. An arrangement to prevent the phenomenon of the flow breaking away from the upper side of a sustaining wing for aircraft and to increase the lift thereof comprising one or a plurality of propulsive airscrews mounted on the trailing edge of the aerofoil, slots arranged in the surface on the upper side of the aerofoil, said slots being arranged in direction of the span of the wing, ducts leading to said airscrews and being connected with said slots and arranged in such a manner that air from the upper side of the aerofoil flows through said slots and ducts to said airscrews.

4. An arrangement to prevent the phenomenon of the flow breaking away from the upper side of a sustaining wing for aircraft and to increase the lift thereof comprising: a plurality of propulsive air screws of the pusher type mounted on the trailing edge of the aerofoil, a plurality of depressions corresponding to the said airscrews formed in the trailing edge of said aerofoil to thereby shield said airscrews against the air flowing on the lower side of the aerofoil.

5. An arrangement to prevent the phenomenon of the flow breaking away from the upper side of a sustaining wing for aircraft and to increase the lift thereof comprising: a plurality of propulsive air screws of the pusher type mounted on the trailing edge of the aerofoil, a plurality of depressions corresponding to the said airscrews formed in the trailing edge of said aerofoil to thereby shield said air screws against the air flowing on the lower side of the aerofoil, said airscrews being swivelly mounted for angular adjustment to as well prevent the phenomenon of the flow breaking away as to increase the lift of the aerofoil by a downward directed discharge of the accelerated air.

6. An arrangement to prevent the phenomenon of the flow breaking away from the upper side of a sustaining wing for aircraft and to increase the lift thereof comprising: a plurality of air screws of the pusher type mounted on the trailing edge of the aerofoil, a plurality of depressions formed in the trailing edge corresponding to said airscrews, one or more controllable airflaps arranged directly behind said air screws and said depressions to direct the discharge air of the airscrews and the aerofoil downward to thereby increase the lift.

7. An arrangement to prevent the phenomenon of the flow breaking away from the upper side of a sustaining wing for aircraft and to increase the lift thereof comprising: one or a plurality of propulsive air-screws of the pusher type mounted on the trailing edge of the aerofoil, one or a plurality of depressions formed in the upper side of the aerofoil, each depression leading to the corresponding air screw, in combination with prime movers housed partly in the sustaining wing, partly protruding on the upper side of the wing where the cross section of the wing decreases in the direction of the air flow and said protruding parts of each prime mover being streamline cowled.

8. An arrangement to prevent the phenomenon of the flow breaking away from the upper side of a sustaining wing for aircraft and to increase the lift thereof comprising: a plurality of propulsive air screws of the pusher type mounted on the trailing edge of the aerofoil, a plurality of depressions formed in the upper side of the aerofoil, each depression leading to the corresponding air screw, in combination with prime movers being mounted within the sustaining wing and distributed in the direction of the span of the wing with their driving shafts in one axial line to thereby enable direct coupling of the prime movers without gears, each prime mover driving one or a plurality of air screws.

Signed at West Allis, Wisconsin, this 18th day of April, 1931.

MATHIAS HENTER.
ERNST KÄSER.